(12) United States Patent
Takemoto

(10) Patent No.: US 10,724,683 B2
(45) Date of Patent: Jul. 28, 2020

(54) HIGH-PRESSURE TANK AND METHOD FOR MANUFACTURING HIGH-PRESSURE TANK

(71) Applicant: NISSAN MOTOR CO., LTD., Yokohama-shi, Kanagawa (JP)

(72) Inventor: Shinichirou Takemoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 527 days.

(21) Appl. No.: 15/501,259

(22) PCT Filed: Aug. 4, 2014

(86) PCT No.: PCT/JP2014/070490
§ 371 (c)(1),
(2) Date: Feb. 2, 2017

(87) PCT Pub. No.: WO2016/020972
PCT Pub. Date: Feb. 11, 2016

(65) Prior Publication Data
US 2017/0219165 A1   Aug. 3, 2017

(51) Int. Cl.
*F17C 1/06* (2006.01)
*B29C 63/00* (2006.01)
(Continued)

(52) U.S. Cl.
CPC ............ *F17C 1/06* (2013.01); *B29C 63/0073* (2013.01); *B29C 63/24* (2013.01); *B29C 70/86* (2013.01);
(Continued)

(58) Field of Classification Search
CPC ........ F17C 2203/0665; F17C 2203/067; F17C 2203/021; F17C 2203/0264;
(Continued)

(56) References Cited

U.S. PATENT DOCUMENTS 5,018,638 A    5/1991   Auberon et al.
6,145,693 A   11/2000   Berglund

FOREIGN PATENT DOCUMENTS

JP           2714434 B2    2/1998
JP        2001-503503 A    3/2001
(Continued)

*Primary Examiner* — Allan D Stevens
(74) *Attorney, Agent, or Firm* — Foley & Lardner LLP

(57) ABSTRACT

A high-pressure tank includes a container main body (10) constituted of a body (11) and dome portions (12) disposed on both ends of the body, and a reinforcing layer (20) formed such that a fiber member is wound around an outer periphery of the container main body. The reinforcing layer includes a hoop winding layer (40) formed by hoop winding that winds the fiber member such that a winding angle is approximately perpendicular to a central axis of the body, and a high helical winding layer (30) formed by high helical winding that winds the fiber member such that a winding angle is inclined with respect to the central axis compared with the hoop winding, and the high helical winding layer extends to the dome portion. The high helical winding layer includes a thick portion having a thickness at an outer side part of a boundary position between the body and the dome portion, which thickness is thicker than a thickness at a part positioned on the body. The hoop winding layer is formed from the body to the dome portion where the thick portion is formed, as a layer at an outer diameter side of the high helical winding layer.

6 Claims, 11 Drawing Sheets

(51) Int. Cl.
  *B29C 63/24* (2006.01)
  *B29C 70/86* (2006.01)
  B29K 105/10 (2006.01)
  B29K 105/20 (2006.01)
  B29L 31/00 (2006.01)

(52) U.S. Cl.
  CPC ...... *B29K 2105/10* (2013.01); *B29K 2105/20* (2013.01); *B29L 2031/7156* (2013.01); *F17C 2201/0109* (2013.01); *F17C 2201/054* (2013.01); *F17C 2201/056* (2013.01); *F17C 2203/0604* (2013.01); *F17C 2203/067* (2013.01); *F17C 2203/0621* (2013.01); *F17C 2203/0624* (2013.01); *F17C 2203/0636* (2013.01); *F17C 2203/0665* (2013.01); *F17C 2203/0673* (2013.01); *F17C 2205/0305* (2013.01); *F17C 2209/2154* (2013.01); *F17C 2221/012* (2013.01); *F17C 2223/035* (2013.01); *F17C 2260/011* (2013.01); *F17C 2270/0168* (2013.01); *Y02E 60/321* (2013.01)

(58) Field of Classification Search
  CPC ............... F17C 2201/0109; F17C 1/06; F17C 2203/0624; F17C 2203/0621
  See application file for complete search history.

(56) References Cited

FOREIGN PATENT DOCUMENTS

| | | | |
|---|---|---|---|
| JP | 2004-144172 A | 5/2004 | |
| JP | 2008-032088 A | 2/2008 | |
| JP | 2014-080999 A | 5/2014 | |
| WO | WO-8504380 A1 * | 10/1985 | ............ B29C 63/24 |
| WO | WO 2012/161006 A1 | 11/2012 | |

* cited by examiner

HIGH-PRESSURE TANK AND METHOD FOR MANUFACTURING HIGH-PRESSURE TANK

TECHNICAL FIELD

The present invention relates to a high-pressure tank and a method for manufacturing the high-pressure tank.

BACKGROUND ART

JP2004-144172A discloses a high-pressure hydrogen tank that reinforces a container main body such that a strip-shaped fiber-reinforced resin member is wound around an outer periphery of the container main body to form a reinforcing layer.

A container main body of a high-pressure hydrogen tank includes a body and dome portions, which are disposed on both sides of the body. When attempting to wind a strip-shaped fiber-reinforced resin member around the dome portion of such-shaped container main body by hoop winding, the fiber-reinforced resin member slides down a curved surface of the dome portion. Thus, at the dome portion having a curved surface, winding slippage of the fiber-reinforced resin member by the hoop winding is likely to occur. Accordingly, a shape of the reinforcing layer may not be made as designed. Therefore, it is considered that a helical winding layer, which is formed by helical winding where the winding slippage is less likely to occur, reinforces the dome portion, however there is a problem that strength adjacent to a boundary position of the body and the dome portion, of the container main body (what is called, a shoulder part of the dome portion) cannot be enhanced by only such helical winding layer.

An object of the present invention is to provide a high-pressure tank that suppresses the winding slippage of the hoop winding on the dome portion of the container main body to ensure enhanced strength of the shoulder part of the dome portion.

SUMMARY OF INVENTION

According to one aspect of the present invention, a high-pressure tank is provided, which tank includes a container main body constituted of a body and dome portions disposed on both ends of the body, and a reinforcing layer formed such that a fiber member is wound around an outer periphery of the container main body. The reinforcing layer includes a hoop winding layer formed by hoop winding that winds the fiber member such that a winding angle is approximately perpendicular to a central axis of the body, and a high helical winding layer formed by high helical winding that winds the fiber member such that a winding angle is inclined with respect to the central axis compared with the hoop winding, and the high helical winding layer extends to the dome portion. The high helical winding layer includes a thick portion having a thickness at an outer side part of a boundary position between the body and the dome portion, which thickness is thicker than a thickness at a part positioned on the body. The hoop winding layer is formed from the body to the dome portion where the thick portion is formed, as a layer at an outer diameter side of the high helical winding layer.

DESCRIPTION OF EMBODIMENTS

The following describes embodiments of the present invention with reference to the drawings.

First Embodiment

Figure 1:
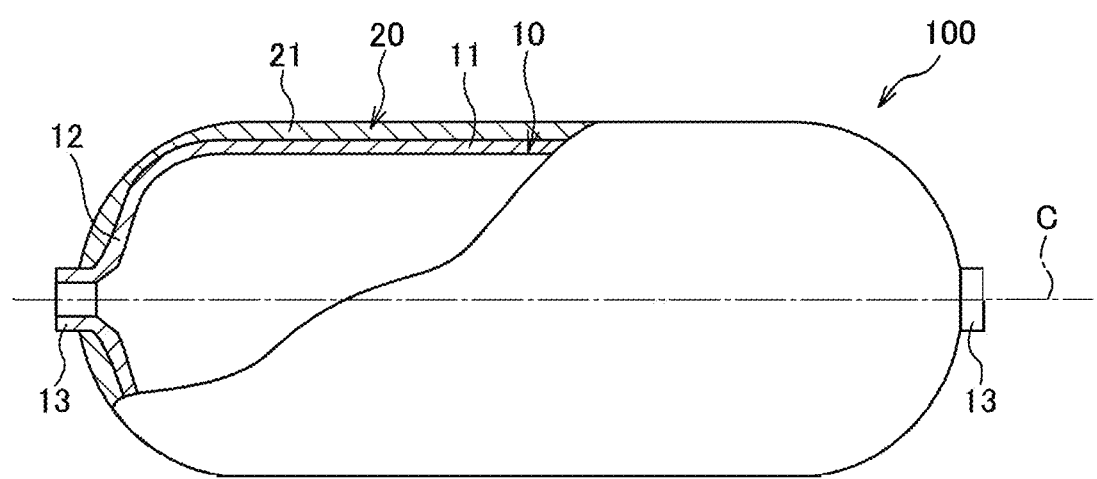
FIG. 1 is a partial cross-sectional view of a high-pressure hydrogen tank according to a first embodiment of the present invention.

The following describes a high-pressure hydrogen tank 100 of a first embodiment of the present invention with reference to FIG. 1. FIG. 1 is a partial cross-sectional view of the high-pressure hydrogen tank 100.

The high-pressure hydrogen tank 100 illustrated in FIG. 1 is a pressure vessel, for example, which is mounted on a fuel cell vehicle and stores hydrogen gas (anode gas) supplied to a fuel cell stack of this vehicle. The specified upper limit pressure of the hydrogen gas stored in the high-pressure hydrogen tank 100 is, for example, set to 35 MPa or 70 MPa.

As illustrated in FIG. 1, the high-pressure hydrogen tank 100 includes a container main body 10 and a reinforcing layer 20, which reinforces strength of this container main body 10.

The container main body 10 of the high-pressure hydrogen tank 100 is a gas storage member that has internally a gas storage space. The container main body 10 is made of a material having gas barrier property, such as metal, polyethylene resin, or polypropylene resin.

The container main body 10 is constituted of a cylindrical-shaped body 11 and dome-shaped dome portions 12, which are disposed on both ends of this body 11. The body 11 and the dome portions 12 are coaxially arranged. At a center of the dome portion 12, that is, a top of the dome portion 12, a boss portion 13, which projects outside along a central axis C (a tank central axis) of the body 11, is formed.

One boss portion 13 is used as a discharge port for discharging the hydrogen gas in the container main body 10. A valve for adjusting discharge flow rate of the hydrogen gas is disposed on this boss portion 13. In contrast, the other boss portion 13 is obstructed by, for example, a lid member.

The reinforcing layer 20 is a lamellar body formed such that a strip-shaped fiber-reinforced resin member 21 (FRP) is wound around an outer periphery of the container main body 10 using a filament winding method. A shape of the reinforcing layer 20 is decided corresponding to performance required for the high-pressure hydrogen tank 100.

The fiber-reinforced resin member 21 (a fiber member), which constitutes the reinforcing layer 20, is a member that impregnates matrix resin such as epoxy resin and unsaturated polyester resin with material fiber. For example, inorganic fiber such as metal fiber, glass fiber, and carbon fiber, and synthetic organic fiber such as aramid fiber are used for the material fiber. These fibers may be used alone or may be used by mixture.

As described above, the reinforcing layer 20 is formed such that the fiber-reinforced resin member 21 is wound around the outer periphery of the container main body 10. A winding method of the fiber-reinforced resin member 21 around the container main body 10 includes hoop winding, low-angle helical winding (low helical winding), high-angle helical winding (high helical winding), and the like. The reinforcing layer 20 is formed such that a hoop winding layer, which is formed such that the fiber-reinforced resin member 21 is wound by the hoop winding, a low-angle helical winding layer (a low helical winding layer), where the fiber-reinforced resin member 21 is wound by the low-angle helical winding, and a high-angle helical winding layer (a high helical winding layer), where the fiber-reinforced resin member 21 is wound by the high-angle helical winding, are laminated in a predetermined order.

Figure 2:
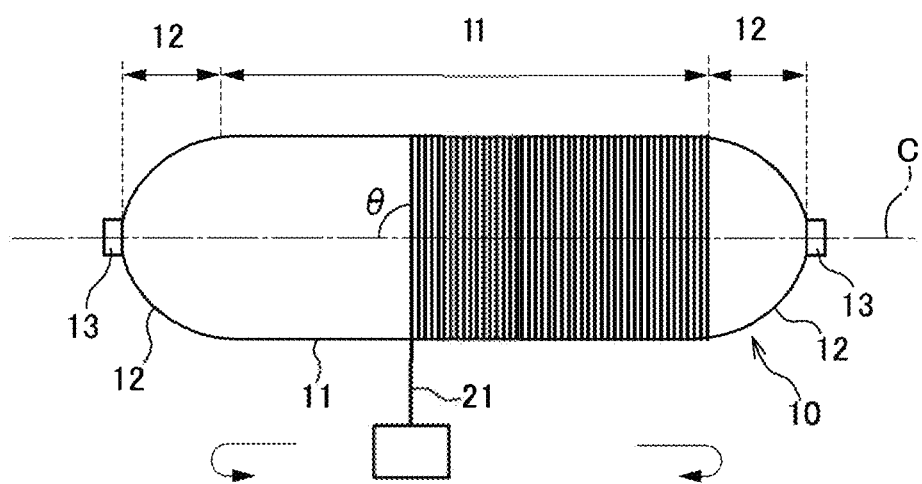
FIG. 2 is a drawing that illustrates hoop winding.
Figure 3A:
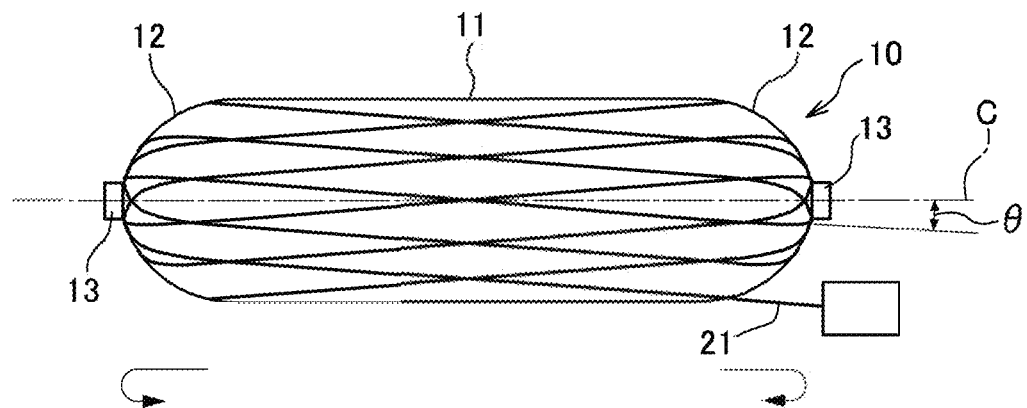
FIG. 3A is a drawing that illustrates low-angle helical winding.
Figure 3B:
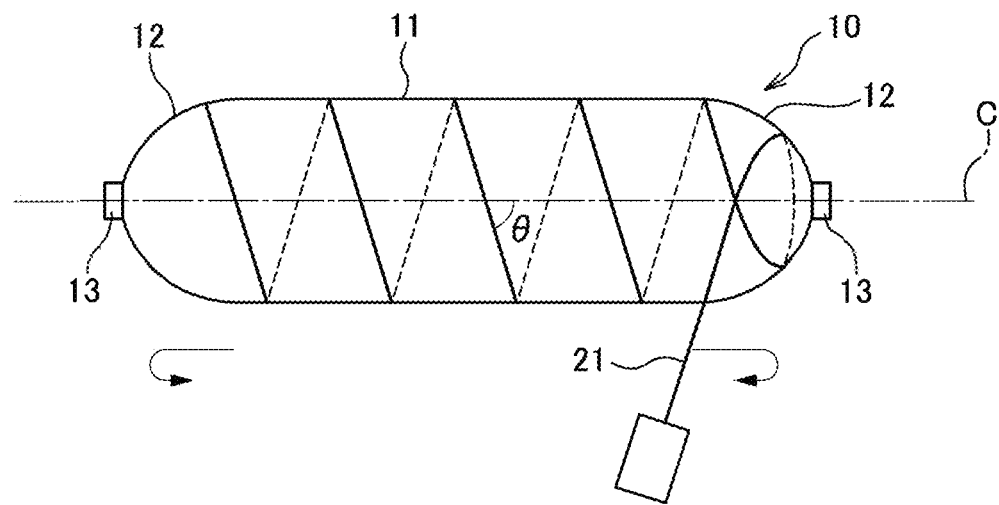
FIG. 3B is a drawing that illustrates high-angle helical winding.

The following describes the winding method of the fiber-reinforced resin member 21 with reference to FIG. 2, FIG. 3A, and FIG. 3B.

FIG. 2 is a drawing that illustrates the hoop winding.

As illustrated in FIG. 2, in the hoop winding, the fiber-reinforced resin member 21 is wound approximately perpendicular to the central axis C of the body 11 of the container main body 10. A wound position in the hoop winding moves along the central axis C of the body 11. Thus, the hoop winding is a winding method where a winding angle θ is approximately vertical. Being approximately vertical includes 90° and an angle of around 90° that may occur such that the fiber-reinforced resin member 21 is shifted in a direction of the central axis C. It should be noted that the winding angle θ is an angle between this central axis C and a winding direction of the fiber-reinforced resin member 21 in a case viewed from a direction perpendicular to the central axis C of the body 11.

Next, the following describes the low-angle helical winding and the high-angle helical winding with reference to FIG. 3A and FIG. 3B. The low-angle helical winding and the high-angle helical winding are winding methods where winding angles are inclined with respect to the central axis C compared with the hoop winding, and the fiber-reinforced resin member 21 is wound containing the dome portion 12.

As illustrated in FIG. 3A, the low-angle helical winding is a winding method where the winding direction of the fiber-reinforced resin member 21 is folded back at the dome portion 12 before the fiber-reinforced resin member 21 makes a circuit of the central axis C at the body 11 of the container main body 10, and the winding angle θ (an angle of an acute angle between the central axis C and the winding direction of the fiber-reinforced resin member 21) is smaller than that of the high-angle helical winding. In the low-angle helical winding, the fiber-reinforced resin member 21 is wound around the container main body 10 such that the boss portion 13 of the dome portion 12 is a winding starting point, that is, the fiber-reinforced resin member 21 is wound on the boss portion 13. In the low-angle helical winding, a winding folding position is a root part of the boss portion 13 at the dome portion 12.

As illustrated in FIG. 3B, the high-angle helical winding is a winding method where the winding direction of the fiber-reinforced resin member 21 is folded back at the dome portion 12 after the fiber-reinforced resin member 21 has made at least a circuit of the central axis C at the body 11 of the container main body 10, and the winding angle θ (the angle of the acute angle between the central axis C and the winding direction of the fiber-reinforced resin member 21) is larger than that of the low-angle helical winding. In the high-angle helical winding, the fiber-reinforced resin member 21 is wound around the container main body 10 such that the fiber-reinforced resin member 21 is wound on the dome portion 12, and the winding folding position is a predetermined position on the dome portion 12 apart from the boss portion 13.

Now, since the dome portion of the container main body of the high-pressure hydrogen tank has a shape bulging hemispherically, when attempting to wind the fiber-reinforced resin member around the dome portion by the hoop winding, the fiber-reinforced resin member slides down from a position where the fiber-reinforced resin member should be wound in design to a boss portion side. Since such winding slippage of the fiber-reinforced resin member occurs, it is difficult to form the hoop winding layer on the dome portion. Accordingly, the dome portion is reinforced by the helical winding layer. However, there is a problem that strength of a position adjacent to a border with the body at the dome portion (what is called, a shoulder part of the dome portion) cannot be enhanced only by such helical winding layer.

The present inventor has found that the fiber-reinforced resin member 21 is wound around the container main body 10 by the high-angle helical winding where the winding slippage is less likely to occur, at the dome portion 12, and thereafter the hoop winding layer is formed on the high-angle helical winding layer, thus ensuring the enhanced strength of the shoulder part of the dome portion 12.

Figure 4:
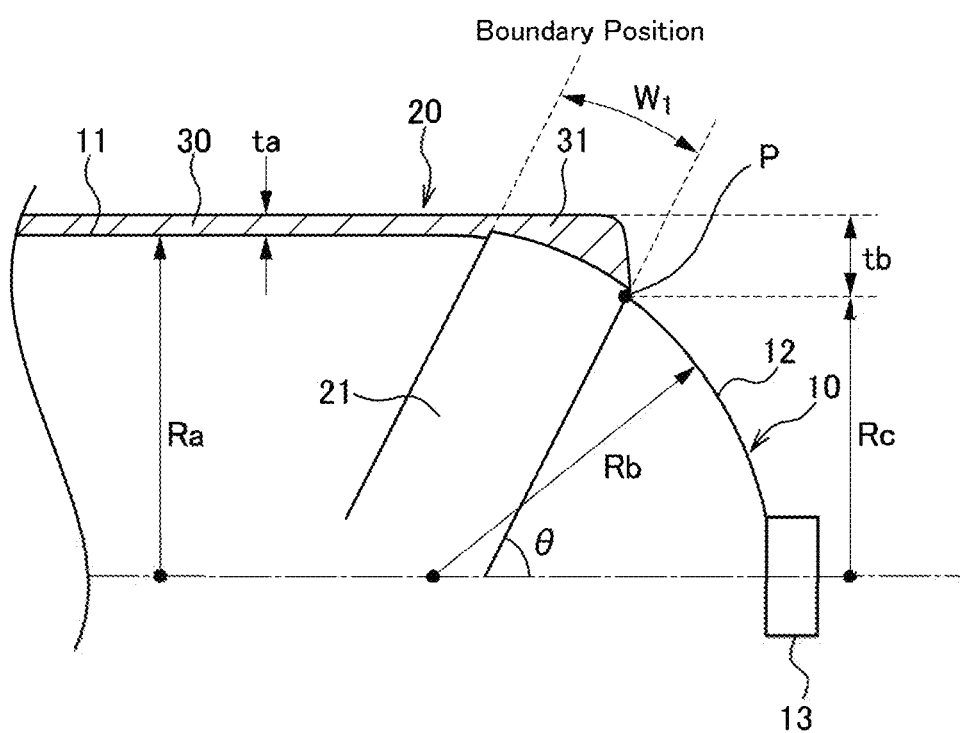
FIG. 4 is a drawing that illustrates a state of a high-angle helical winding layer when the high-angle helical winding is performed around a container main body.
Figure 5:
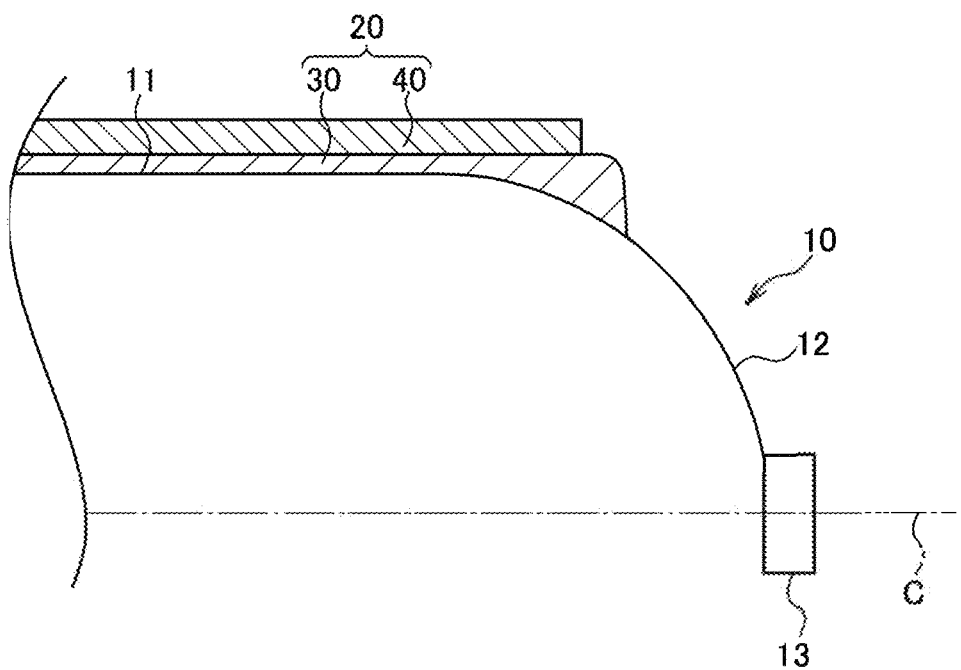
FIG. 5 is a drawing that illustrates a state of a hoop winding layer when the hoop winding is performed around the container main body.

The following describes a forming method of the reinforcing layer 20 of the high-pressure hydrogen tank 100 according to the first embodiment with reference to FIG. 4 and FIG. 5.

As illustrated in FIG. 4, in the first embodiment, a high-angle helical winding layer 30 is formed on the container main body 10 such that the strip-shaped fiber-reinforced resin member 21 is wound around the container main body 10 by the high-angle helical winding where the slippage is less likely to occur, at the dome portion 12 (a high helical winding layer forming step).

In the case of the high-angle helical winding, the winding folding position of the fiber-reinforced resin member 21 is set at a predetermined position P (on a circle including P) on the dome portion 12, and the winding of the fiber-reinforced resin member 21 tends to concentrate at an end portion of the high-angle helical winding layer 30. Therefore, the end portion of the high-angle helical winding layer 30 is configured as a thick portion 31, whose thickness is thicker than a thickness of the high-angle helical winding layer 30 positioned on the body 11.

The winding folding position of the fiber-reinforced resin member 21 on the high-angle helical winding layer 30, that is, an outermost end of the high-angle helical winding layer 30 is set at a position deviated to a side of the dome portion 12 by one width W1 of the fiber-reinforced resin member 21 along a surface shape of the dome portion 12, from a boundary position between the body 11 and the dome portion 12. This arranges the thick portion 31 of the high-angle helical winding layer 30 to be positioned outside the boundary position between the body 11 and the dome portion 12. It should be noted that the position of the outermost end of the high-angle helical winding layer 30 could be set at any position as necessary.

An outer diameter of the thick portion 31 of the high-angle helical winding layer 30 is set to equal to or more than an outer diameter of the high-angle helical winding layer 30 positioned on the body 11. As illustrated in FIG. 4, it is preferred that the outer diameter of the thick portion 31 of the high-angle helical winding layer 30 and the outer diameter of the high-angle helical winding layer 30 positioned on the body 11 are set approximately equally each other.

In order to match the outer diameter of the thick portion 31 of the high-angle helical winding layer 30 and the outer diameter of the high-angle helical winding layer 30 positioned on the body 11, a maximum thickness tb of the thick portion 31 and a thickness ta of the high-angle helical winding layer 30 on the body 11 are set to fulfill a formula (1).

$$tb = [Ra \times \cos \theta / \{Rb \times \cos(\arc \sin(Rc/Rb))\}] \times ta \quad (1)$$

It should be noted that, in the formula (1), Ra is a radius of the body 11 of the container main body 10, Rb is a radius of the dome portion 12 of the container main body 10, Rc is a distance between the central axis C of the body 11 and the winding folding position P, and θ is a winding angle between the central axis C of the body 11 and the fiber-reinforced resin member 21.

As described above, the thick portion 31 of the high-angle helical winding layer 30 is arranged on the shoulder part of the dome portion 12 of the container main body 10, thus ensuring suppression of inclining along the surface shape of the dome portion 12, of the surface of the high-angle helical winding layer 30 at the shoulder part of the dome portion 12.

Thus, after forming the high-angle helical winding layer 30 on the container main body 10, the strip-shaped fiber-reinforced resin member 21 is wound around an outside of the high-angle helical winding layer 30 by the hoop winding as illustrated in FIG. 5. That is, a hoop winding layer 40 is formed as a layer at an outer diameter side of the high-angle helical winding layer 30 (a hoop winding layer forming step).

In this embodiment, the surface of the high-angle helical winding layer 30 is hardly inclined even at the shoulder part of the dome portion 12, thus ensuring suppression of the winding slippage of the fiber-reinforced resin member 21 when forming the hoop winding layer 40 on the high-angle helical winding layer 30 positioned on the dome portion 12. This forms the hoop winding layer 40 from the thick portion 31 at one end side to the thick portion 31 at the other end side, of the high-angle helical winding layer 30.

Thus, after the high-angle helical winding layer 30 and the hoop winding layer 40 are formed, the helical winding layers and the hoop winding layers are additionally formed in a predetermined order to constitute the reinforcing layer 20 as a laminated body. This reinforces the entire outer periphery of the container main body 10 to manufacture the high-pressure hydrogen tank 100 constituted of the container main body 10 and the reinforcing layer 20.

In this embodiment, on the container main body 10 in a state where the fiber-reinforced resin member 21 is not wound, the high-angle helical winding layer 30 is formed, and thereafter the hoop winding layer 40 is formed. However, this embodiment is not limited to such layer forming method.

Figure 6A:
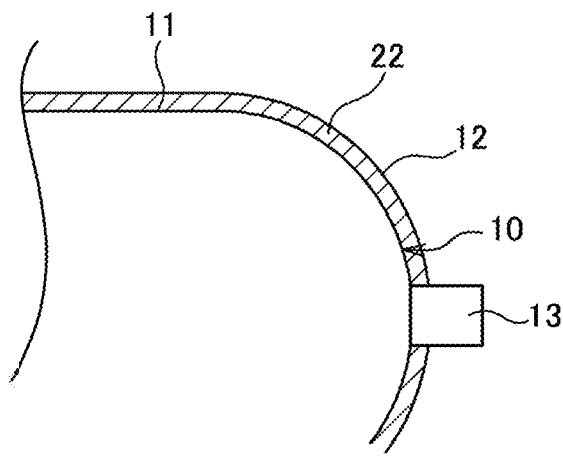
FIG. 6A is a drawing that illustrates a state of the container main body before the high-angle helical winding is performed.
Figure 6B:
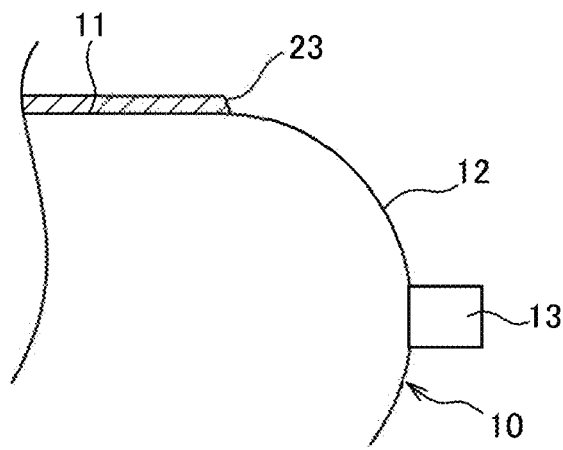
FIG. 6B is a drawing that illustrates a state of the container main body before the high-angle helical winding is performed.

For example, as illustrated in FIG. 6A, on the container main body 10 in a state where the low-angle helical winding layer or a composite layer 22, which is constituted of the low-angle helical winding layer and the high-angle helical winding layer, is formed on the body 11 and the dome portion 12, the high-angle helical winding layer 30 may be formed, and thereafter the hoop winding layer 40 may be formed. As illustrated in FIG. 6B, on the container main body 10 in a state where a hoop winding layer 23 has already formed on the body 11, the high-angle helical winding layer 30 may be formed, and thereafter the hoop winding layer 40 may be formed.

In the case where the high-angle helical winding layer 30 is formed on the container main body 10 in the state where the layer of the fiber-reinforced resin member 21 has already been formed, the outer diameter of the thick portion 31 of the high-angle helical winding layer 30 is set to equal to or more than the outer diameter of the high-angle helical winding layer 30 positioned on the body 11, considering a thickness of a layer, which is a foundation layer.

The above-described high-pressure hydrogen tank 100 of the first embodiment can obtain the following effects.

The high-pressure hydrogen tank 100 includes the container main body 10 constituted of the body 11 and the dome portion 12, and the reinforcing layer 20 formed such that the strip-shaped fiber-reinforced resin member 21 is wound around the outer periphery of the container main body 10. The reinforcing layer 20 includes the high-angle helical winding layer 30 formed by the high-angle helical winding where the winding angle is inclined more than that of the hoop winding and the fiber member is wound containing the dome portion, and the hoop winding layer 40 formed at the outer diameter side of the high-angle helical winding layer 30. The high-angle helical winding layer 30 includes the thick portion 31 whose thickness at the outer side part of the boundary position between the body 11 and the dome portion 12 is thicker than the thickness at the part positioned on the body 11. The hoop winding layer 40 is formed from the body 11 to the dome portion 12 where the thick portion 31 is formed. It should be noted that the high-angle helical winding layer 30 is formed at the high helical winding layer forming step, and the hoop winding layer 40 is formed at the hoop winding layer forming step.

Thus, the thick portion 31 of the high-angle helical winding layer 30 is arranged adjacent to the boundary position between the body 11 and the dome portion 12 (the shoulder part of the dome portion 12), thus ensuring a gradual surface gradient of the high-angle helical winding layer 30 on the dome portion 12 to make this surface approximately flat. Therefore, on the high-angle helical winding layer 30 positioned on the dome portion 12, the winding slippage of the fiber-reinforced resin member 21 in the hoop winding can be suppressed. Accordingly, this can expand a forming range of the hoop winding layer 40 to not only the body 11 but also the dome portion 12 side, thus ensuring the enhanced strength of the shoulder part of the dome portion 12. This can form the reinforcing layer 20 as designed to obtain the high-pressure hydrogen tank 100 having desired performance.

The outer diameter of the thick portion 31 of the high-angle helical winding layer 30, which constitutes the reinforcing layer 20, is set to be approximately equal to the outer diameter of the high-angle helical winding layer 30 positioned on the body 11 of the container main body 10. This can form the surface of the high-angle helical winding layer 30 positioned on the dome portion 12 to a flat surface, thus ensuring a sure prevention of the winding slippage of the fiber-reinforced resin member 21 in the hoop winding layer forming.

Furthermore, the high-angle helical winding layer 30 is configured such that the winding folding position (the outermost end) of the fiber-reinforced resin member 21 is the position deviated to the dome portion 12 side by one width W1 of the fiber-reinforced resin member 21 from the boundary position between the body 11 and the dome portion 12. Such configuration can accurately arrange the end portion (the thick portion 31) of the high-angle helical winding layer 30, which is likely to become thick, at the shoulder part of the dome portion 12 to surely enhance the strength of this shoulder part.

Figure 7A:
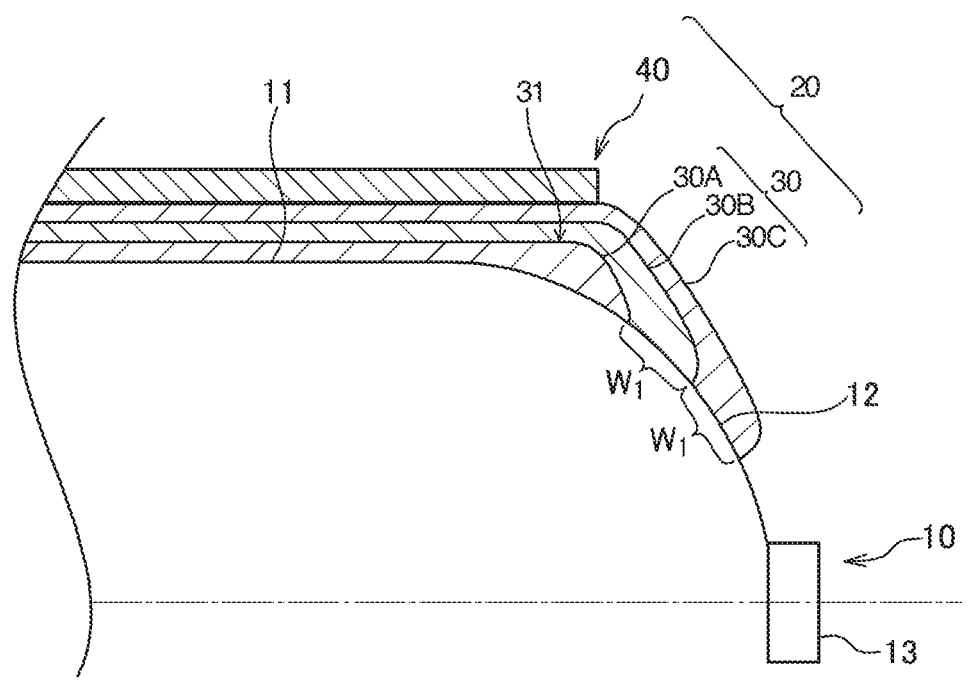
FIG. 7A is a drawing that illustrates a modification of the first embodiment.
Figure 7B:
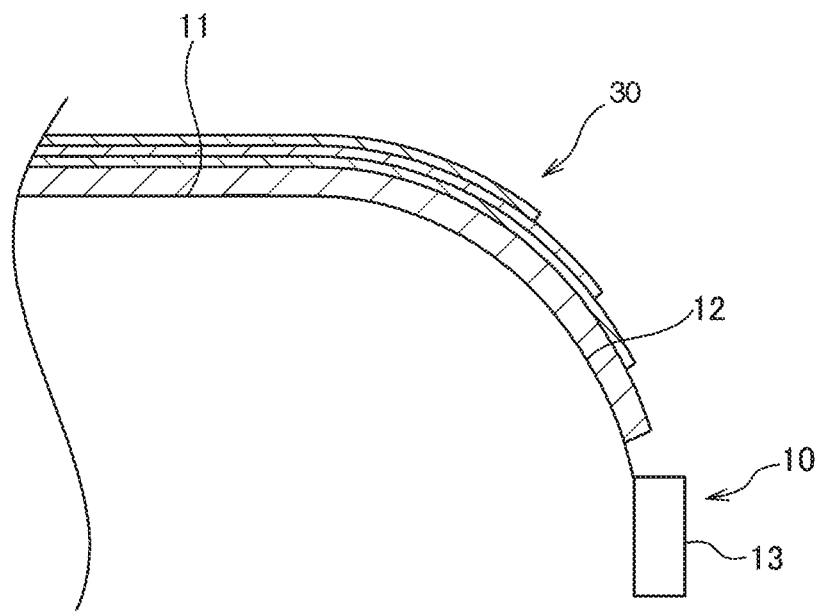
FIG. 7B is a drawing that illustrates a comparative example against the modification of the first embodiment.

It should be noted that the reinforcing layer 20 may be configured as illustrated in FIG. 7A, as one modification of the first embodiment. That is, as illustrated in FIG. 7 A, the high-angle helical winding layer 30 may be a laminated structure constituted of a plurality of layers 30A, 30B, and 30C. Even in such structure, since the thick portion 31 of the high-angle helical winding layer 30 is positioned on the shoulder part of the dome portion 12, a surface of the uppermost layer 30C of the high-angle helical winding layer 30 at the shoulder part is flat, and the hoop winding layer 40 can be formed at its outside without the winding slippage.

At the high-angle helical winding layer 30 constituted of the plurality of layers, between adjacent upper and lower layers, the winding folding position (the outermost end) of the upper side layer is, for example, set to be the position deviated to the dome portion 12 side by one width W1 of the fiber-reinforced resin member 21 from the winding folding position (the outermost end) of the lower side layer. That is, an end portion of the upper side layer is formed to be positioned at the outside by one width of the fiber-reinforced resin member 21, of an end portion of the lower side layer. Laminating the upper side layer so as to cover the lower side layer in the high-angle helical winding where the end portion is likely to be thick can form the surface shape of the high-angle helical winding layer 30 to be smooth, compared with a case laminating the respective layers in order from the lower side layer as layer widths becoming narrow as illustrated in a comparative example in FIG. 7B.

Second Embodiment

Next, the following describes a high-pressure hydrogen tank 100 according to a second embodiment of the present invention. It should be noted that, in the following embodiment, like reference numerals designate configurations and the like with functions corresponding or identical to those in the first embodiment, and therefore such configurations will not be further elaborated here.

The first embodiment is a technique that prevents the winding slippage of the fiber-reinforced resin member 21 when the hoop winding is performed around the container main body 10. The second embodiment is a technique that prevents the winding slippage of the fiber-reinforced resin member 21 when the low-angle helical winding is performed around the container main body 10.

Figure 8:
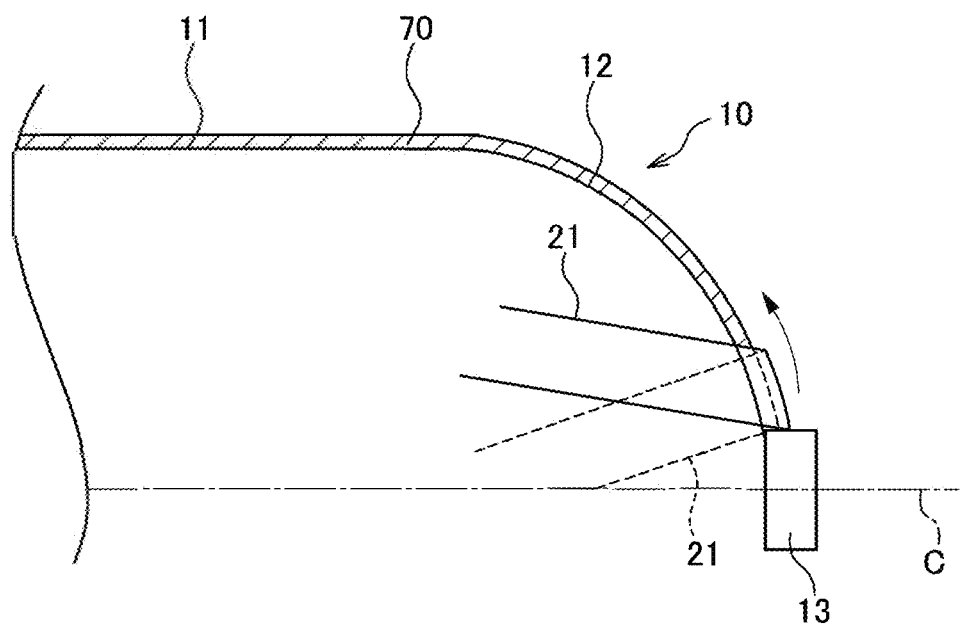
FIG. 8 is a drawing that illustrates a reference example where the low-angle helical winding is performed around the container main body.

As illustrated in FIG. 8, in the low-angle helical winding, as the fiber-reinforced resin member 21 is wound on the boss portion 13 of the dome portion 12, that is, the fiber-reinforced resin member 21 is wound around the container main body 10 in a state where a part of the fiber-reinforced member 21 is in contact with the boss portion 13.

As illustrated in a dashed line in FIG. 8, in a case where the strip-shaped fiber-reinforced resin member 21 is wound from the boss portion 13 toward the central axis C of the body 11, the boss portion 13 itself functions as a regulating member that prevents the winding slippage, thus there is no winding slippage of the fiber-reinforced resin member 21.

However, as illustrated in a solid line in FIG. 8, in a case where the fiber-reinforced resin member 21 is wound in a direction separating from the boss portion 13 and the central axis C, the dome portion 12 of the container main body 10 has a curved shape, thus the fiber-reinforced resin member 21 is positionally deviated in an arrow direction to generate the winding slippage. When continuing to wind the fiber-reinforced resin member 21 by the low-angle helical winding, the fiber-reinforced resin member 21 concentrates at the root part of the boss portion 13, thus a low-angle helical winding layer 70 has a pointed shape at this root part. The sharper the shape becomes, the more likely the winding slippage occurs in the above-described low-angle helical winding.

The present inventor has found that the fiber-reinforced resin member 21 is wound around the container main body 10 by the high-angle helical winding, where the winding slippage is less likely to occur, at the dome portion 12, and thereafter the low-angle helical winding is performed, thus ensuring suppression of the winding slippage by the low-angle helical winding.

Figure 9:
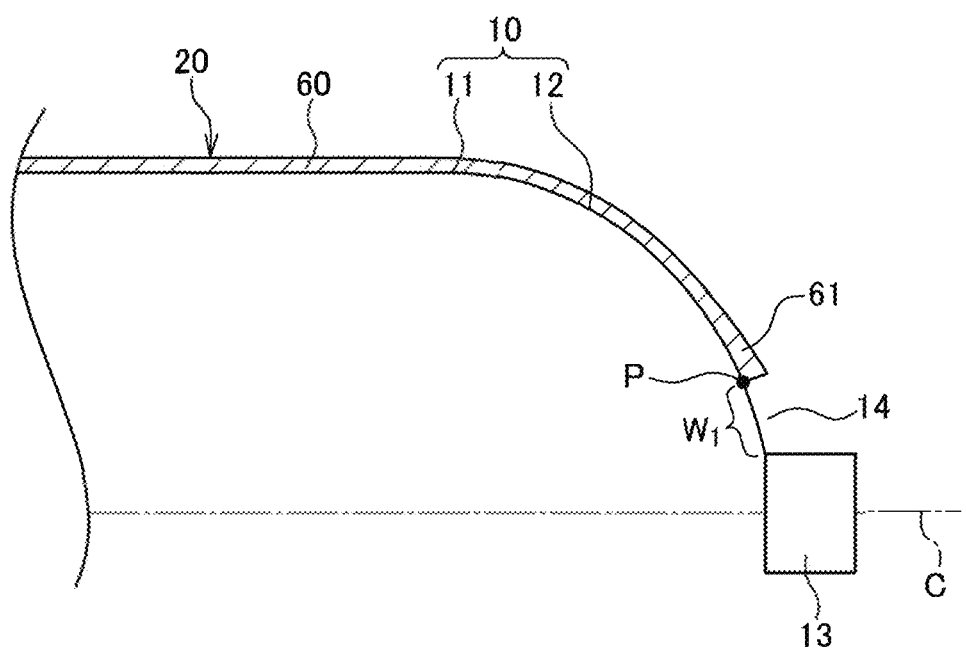
FIG. 9 is a drawing that illustrates a state of a high-angle helical winding layer when the high-angle helical winding is performed around a container main body according to a second embodiment.
Figure 10:
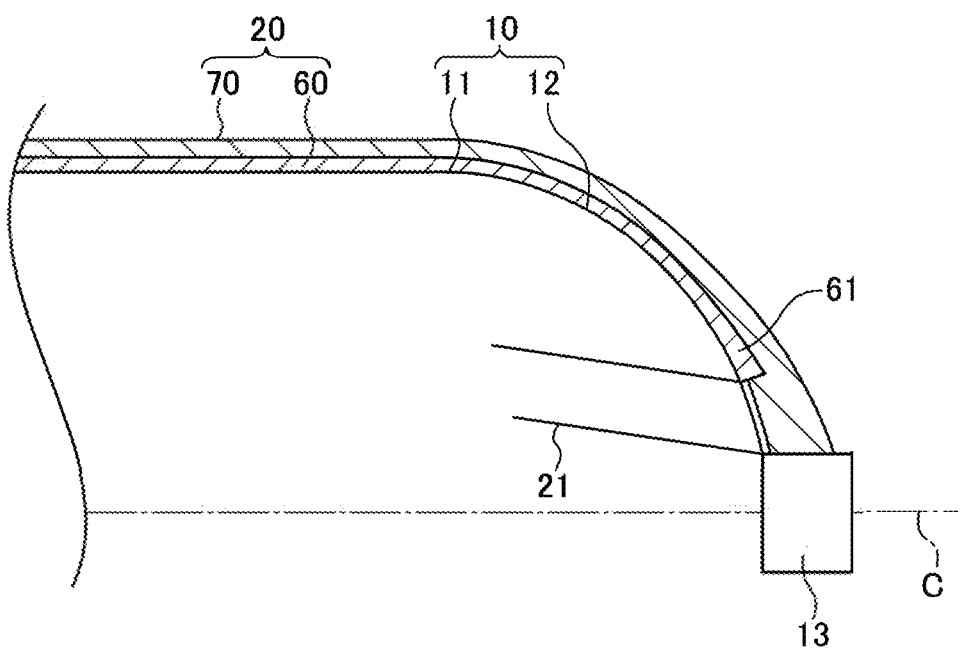
FIG. 10 is a drawing that illustrates a state of a low-angle helical winding layer when the low-angle helical winding is performed around the container main body according to the second embodiment.

The following describes a forming method of a reinforcing layer 20 of the high-pressure hydrogen tank 100 according to the second embodiment with reference to FIG. 9 and FIG. 10.

As illustrated in FIG. 9, in the second embodiment, the strip-shaped fiber-reinforced resin member 21 is wound around the container main body 10 by the high-angle helical winding to form a high-angle helical winding layer 60 on the container main body 10 (a high helical winding layer forming step).

In the case of the high-angle helical winding, the winding folding position of the fiber-reinforced resin member 21 is set at the predetermined position P (on the circle including P) on the dome portion 12, thus the winding of the fiber-reinforced resin member 21 tends to concentrate at an end portion of the high-angle helical winding layer 60. Therefore, the end portion of the high-angle helical winding layer 60 is constituted as a thick portion 61 whose thickness is thicker than a thickness of the high-angle helical winding layer 60 positioned on the body 11.

The winding folding position P of the fiber-reinforced resin member 21 at the high-angle helical winding layer 60, that is, an outermost end of the high-angle helical winding layer 60 is set at a position apart from a root position of the boss portion 13 along the surface shape of the dome portion 12, by one width W1 of the fiber-reinforced resin member 21. Accordingly, between the end portion of the high-angle helical winding layer 60 and the boss portion 13, an annular clearance 14 is formed along a circumference of the boss portion 13. It should be noted that the position of the outermost end of the high-angle helical winding layer 60 may be arranged so as to be spaced a distance larger than one width W1 of the fiber-reinforced resin member 21 from the root position of the boss portion 13.

Thus, after forming the high-angle helical winding layer 60 on the container main body 10, the fiber-reinforced resin member 21 is wound around an outside of the high-angle helical winding layer 60 by the low-angle helical winding as illustrated in FIG. 10. That is, as a layer at an outer diameter side of the high-angle helical winding layer 30, the low-angle helical winding layer 70 is formed (a low helical winding layer forming step).

In the low-angle helical winding, the fiber-reinforced resin member 21 is wound around the container main body 10 such that the fiber-reinforced resin member 21 is wound on the boss portion 13 and passes through the clearance 14, which is formed between the thick portion 61 of the high-angle helical winding layer 60 and the boss portion 13. At this time, the boss portion 13 and the thick portion 61 of the high-angle helical winding layer 60 restrict position deviation of the fiber-reinforced resin member 21, thus ensuring formation of the low-angle helical winding layer 70 while suppressing the winding slippage.

Thus, after forming the high-angle helical winding layer 60 and the low-angle helical winding layer 70, the hoop winding layers and the helical winding layers are further formed in a predetermined order, thus constituting the reinforcing layer 20 as a laminated body. This reinforces the entire outer periphery of the container main body 10 to manufacture the high-pressure hydrogen tank 100 constituted of the container main body 10 and the reinforcing layer 20.

In this embodiment, on the container main body 10 in the state where the fiber-reinforced resin member 21 is not wound, the high-angle helical winding layer 60 is formed, and thereafter the low-angle helical winding layer 70 is formed. However, this embodiment is not limited to such layer forming method. For example, on the container main body 10 in the state where the hoop winding layer or the helical winding layer have already formed (see FIG. 6A and FIG. 6B), the high-angle helical winding layer 60 may be formed, and thereafter the low-angle helical winding layer 70 may be formed.

The above-described high-pressure hydrogen tank 100 of the second embodiment can obtain the following effects.

The high-pressure hydrogen tank 100 includes the container main body 10 constituted of the body 11 and the dome portion 12, and the reinforcing layer 20 formed such that the strip-shaped fiber-reinforced resin member 21 is wound around the outer periphery of the container main body 10. The reinforcing layer 20 includes the high-angle helical winding layer 60 formed by the fiber-reinforced resin member 21 wound around the body 11 of the container main body 10 by the high-angle helical winding, and the low-angle helical winding layer 70 formed outside the high-angle helical winding layer 30. Then, the end portion of the high-angle helical winding layer 60 is arranged at the position apart from the boss portion 13 on the dome portion 12, and configured as the thick portion 61 whose thickness is thicker than the thickness of the high-angle helical winding layer 60 positioned on the body 11.

Thus, the thick portion 61 of the high-angle helical winding layer 60 is arranged at the position apart from the boss portion 13 on the dome portion 12, thus ensuring the formation of the clearance 14 between the thick portion 61 and the boss portion 13 to perform the low-angle helical winding utilizing this clearance 14. That is, the boss portion 13 and the thick portion 61 of the high-angle helical winding layer 60 restrict the position deviation of the fiber-reinforced resin member 21, thus ensuring the formation of the low-angle helical winding layer 70 while suppressing the winding slippage. This can form the reinforcing layer 20 as designed to obtain the high-pressure hydrogen tank 100 having the desired performance.

Furthermore, the clearance 14 between the thick portion 61 of the high-angle helical winding layer 60 and the boss portion 13 is set to one width of the strip-shaped fiber-reinforced resin member 21. Such setting can surely suppress the winding slippage of the fiber-reinforced resin member 21 in the low-angle helical winding where the fiber-reinforced resin member 21 is wound around the container main body 10 centering the root part of the boss portion 13.

Figure 11:
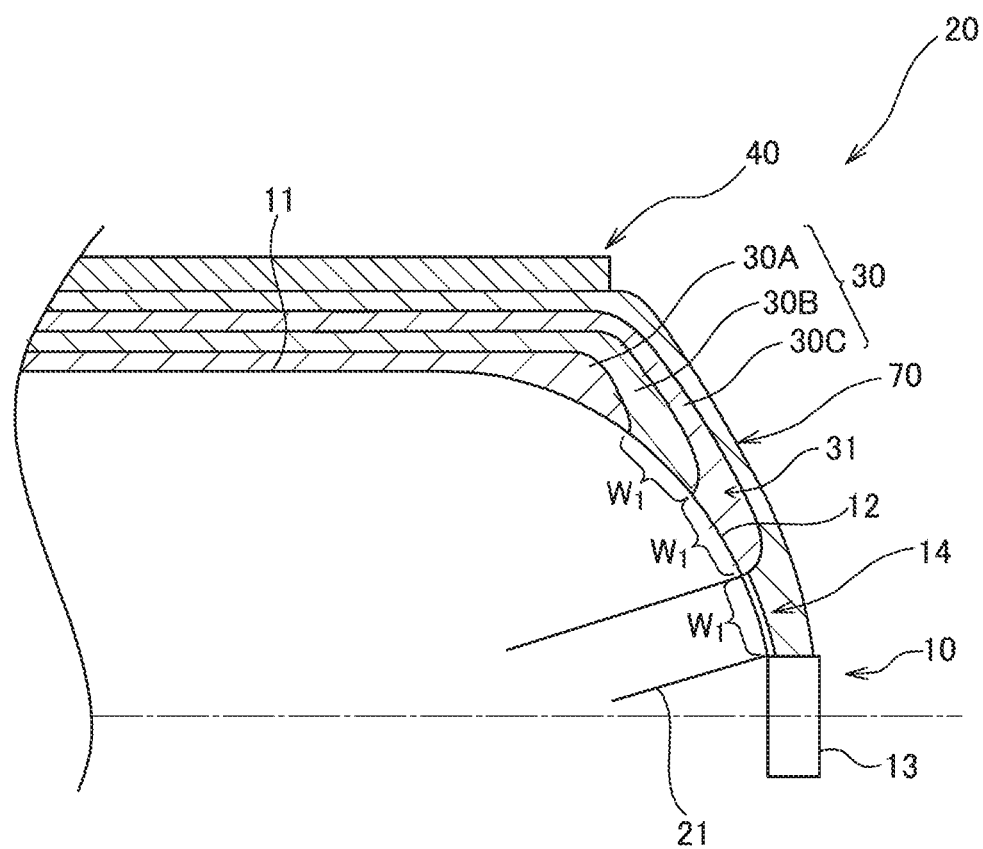
FIG. 11 is a drawing that illustrates a modification by combination of the first and second embodiments.

It should be noted that the reinforcing layer 20 may be constituted as illustrated in FIG. 11, as one modification as combining the first and second embodiments. That is, as illustrated in FIG. 11, the reinforcing layer 20 includes the high-angle helical winding layer 30 constituted of the plurality of layers 30A to 30C, the low-angle helical winding layer 70 described in the second embodiment, and the hoop winding layer 40 as a layer at an outer diameter side of the low-angle helical winding layer 70, on the container main body 10.

The high-angle helical winding layer 30 has, for example, a three-layered structure. Between the adjacent upper and lower layers 30A to 30C, the winding folding position (the outermost end) of the upper side layer is, for example, set to be a position deviated to the dome portion 12 side by one width W1 of the fiber-reinforced resin member 21 from the winding folding position (the outermost end) of the lower side layer. That is, the high-angle helical winding layer 30 is formed such that the end portion of the upper side layer is positioned at the outside by one width of the fiber-reinforced resin member 21, of the end portion of the lower side layer. With such laminated structure, the high-angle helical winding layer 30 positioned outside the boundary position between the body 11 and the dome portion 12 is formed to be the thick portion 31. As a result, the surface of the high-angle helical winding layer 30 positioned on the shoulder part of the dome portion 12 can be formed to approximately flat, and a forming range of the hoop winding layer 40 formed thereafter can be expanded to not only the body 11 but also the dome portion 12 side. Laminating the upper side layer so as to cover the lower side layer at the high-angle helical winding layer 30 can form the surface shape of the entire high-angle helical winding layer 30 to be smooth.

Furthermore, the winding folding position of the fiber-reinforced resin member 21 at the outermost layer 30C of the high-angle helical winding layer 30, that is, the outermost end of the outermost layer 30C is set at a position apart from the root position of the boss portion 13 along the surface shape of the dome portion 12, by one width W1 of the fiber-reinforced resin member 21. Accordingly, between the thick portion 31 of the high-angle helical winding layer 30 and the boss portion 13, the annular clearance 14 is formed along the circumference of the boss portion 13. Thus, the thick portion 31 of the high-angle helical winding layer 30 constituted of the plurality of layers 30A to 30C performs the function similar to that of the thick portion 61 described in the second embodiment. It should be noted that the position of the outermost end of the outermost layer 30C may be arranged so as to be spaced the distance larger than one width W1 of the fiber-reinforced resin member 21 from the root position of the boss portion 13.

In the low-angle helical winding performed after the formation of the high-angle helical winding layer 30, the fiber-reinforced resin member 21 is wound around the container main body 10 such that the fiber-reinforced resin member 21 is wound on the boss portion 13 and passes through the clearance 14, which is formed between the thick portion 31 of the high-angle helical winding layer 30 and the boss portion 13. At this time, the boss portion 13 and the thick portion 31 of the high-angle helical winding layer 30 restrict the position deviation of the fiber-reinforced resin member 21, thus ensuring the formation of the low-angle helical winding layer 70 while suppressing the winding slippage.

The embodiments of the present invention described above are merely illustration of some application examples of the present invention and not of the nature to limit the technical scope of the present invention to the specific constructions of the above embodiments.

The body 11 of the container main body 10 has a cylindrical shape, however the body 11 is not limited to such shape. For example, the body 11 may be formed as a member having an elliptical-shaped cross-sectional surface, and may be formed as a member having a flat surface at a part of the surface. The dome portion 12 of the container main body 10 has a dome shape, however the dome portion 12 is not limited to such shape. For example, the dome portion 12 may be formed as a member having a flat surface at a part of the hemispherical surface.

The invention claimed is:

1. A high-pressure tank comprising:
    a container main body comprising a body and dome portions disposed on both ends of the body, the container main body having boundary positions between the both ends and the dome portions; and
    a reinforcing layer formed by winding at least one fiber member around an outer periphery of the container main body, wherein
    the reinforcing layer includes:
        a high helical winding layer formed on an outer periphery of the body, and
        a hoop winding layer formed on an outer periphery of the high helical winding layer by hoop winding that winds the at least one fiber member with a winding angle approximately perpendicular to a central axis of the body;
    wherein the high helical winding layer is formed by high helical winding that winds the at least one fiber member with a winding angle inclined with respect to the central axis compared with the hoop winding, the high helical winding layer extending to one of the dome portions, wherein
    the high helical winding layer includes a thick portion on the one of the dome portions, the thick portion having a thickness thicker than a thickness at a part positioned on the body,
    the hoop winding layer is formed to reach the thick portion,
    the thick portion has an outer diameter approximately equal to an outer diameter of the high helical winding layer positioned on the body, and
    the high helical winding layer has a winding folding position of the at least one fiber member that is deviated outside by one width of the at least one fiber member from one of the boundary positions.

2. The high-pressure tank according to claim 1, wherein
    one of the dome portions includes a boss portion projecting outside from a top of the one of the dome portions,
    the reinforcing layer further includes a low-angle helical winding layer formed by low-angle helical winding such that a winding angle to the central axis of the body is set smaller than the winding angle of the high helical winding,
    the high helical winding layer is formed to form a clearance between the thick portion and the boss portion, and
    the at least one fiber member that forms the low-angle helical winding layer is wound so as to pass through the clearance between the thick portion and the boss portion.

3. The high-pressure tank according to claim 2, wherein
    a distance between a winding folding position of an upper side layer of the high helical winding layer and the boss portion is set to one width of the at least one fiber member.

4. The high-pressure tank according to claim 1, wherein
    the high helical winding layer comprises a plurality of layers including an upper side layer and a lower side layer, and
    the upper side layer has a winding folding position of the at least one fiber member that is located outside a winding folding position of the at least one fiber member of the lower side layer.

5. The high-pressure tank according to claim 4, wherein
    the winding folding positions of adjacent layers of the plurality of layers are deviated by one width of the at least one fiber member.

6. A high-pressure tank comprising:
    a container main body comprising a body and dome portions disposed on both ends of the body, the container main body having boundary positions between the both ends and the dome portions; and
    a reinforcing layer formed by winding at least one fiber member around an outer periphery of the container main body, wherein
    the reinforcing layer includes:
        a high helical winding layer formed on an outer periphery of the body, and
        a hoop winding layer formed on an outer periphery of the high helical winding layer by hoop winding that winds the at least one fiber member with a winding angle approximately perpendicular to a central axis of the body;
    wherein the high helical winding layer is formed by high helical winding that winds the at least one fiber member with a winding angle inclined with respect to the central axis compared with the hoop winding, the high helical winding layer extending to one of the dome portions, wherein
    the high helical winding layer includes a thick portion on the one of the dome portions, the thick portion having a thickness thicker than a thickness at a part positioned on the body,
    the hoop winding layer is formed to reach the thick portion,
    the thick portion has an outer diameter approximately equal to an outer diameter of the high helical winding layer positioned on the body,
    one of the dome portions includes a boss portion projecting outside from a top of the one of the dome portions,
    the reinforcing layer further includes a low-angle helical winding layer formed by low-angle helical winding such that a winding angle to the central axis of the body is set smaller than the winding angle of the high helical winding, the high helical winding layer is formed to form a clearance between the thick portion and the boss portion, the at least one fiber member that forms the low-angle helical winding layer is wound so as to pass through the clearance between the thick portion and the boss portion, and a distance between a winding folding position of an upper side layer of the high helical winding layer and the boss portion is set to one width of the at least one fiber member.

\* \* \* \* \*